United States Patent
Rivera (10) Patent No.: US 9,349,009 B2
(45) Date of Patent: May 24, 2016

(54) METHOD AND APPARATUS FOR FIRMWARE BASED SYSTEM SECURITY, INTEGRITY, AND RESTORATION

(71) Applicant: Paul A. Rivera, San Antonio, TX (US)

(72) Inventor: Paul A. Rivera, San Antonio, TX (US)

( * ) Notice: Subject to any disclaimer, the term of this patent is extended or adjusted under 35 U.S.C. 154(b) by 0 days.

(21) Appl. No.: 14/332,359

(22) Filed: Jul. 15, 2014

(65) Prior Publication Data

US 2015/0019850 A1  Jan. 15, 2015

Related U.S. Application Data

(60) Provisional application No. 61/846,606, filed on Jul. 15, 2013.

(51) Int. Cl.
| | |
|---|---|
| *G06F 21/00* | (2013.01) |
| *G06F 21/57* | (2013.01) |
| *G06F 9/00* | (2006.01) |
| *G06F 15/16* | (2006.01) |
| *G06F 17/00* | (2006.01) |

(52) U.S. Cl.
CPC .................................. *G06F 21/572* (2013.01)

(58) Field of Classification Search
None
See application file for complete search history.

(56) References Cited

U.S. PATENT DOCUMENTS

| | | | | |
|---|---|---|---|---|
| 7,225,327 | B1 * | 5/2007 | Rasmussen et al. | 713/2 |
| 7,974,416 | B2 | 7/2011 | Zimmer et al. | |
| 2010/0275001 | A1 * | 10/2010 | Yoshioka et al. | 713/2 |
| 2010/0306359 | A1 * | 12/2010 | Dehaan et al. | 709/223 |
| 2013/0055230 | A1 * | 2/2013 | Kim | 717/168 |
| 2014/0068585 | A1 * | 3/2014 | Young et al. | 717/168 |
| 2014/0156981 | A1 * | 6/2014 | Hamid | 713/2 |

* cited by examiner

*Primary Examiner* — Shin-Hon Chen
(74) *Attorney, Agent, or Firm* — Taboada Law Firm, PLLC; John M. Taboada (57) ABSTRACT

Methods and systems for firmware based system security, integrity, and restoration are disclosed, including (a) determining in a pre-boot environment which mode a security and policy enforcement platform ("platform") should be loaded into firmware of a computing system; (b) if the determination made in step (a) is that it is the first time for the platform to be loaded, then loading the platform into a setup mode; (c) if the determination made in step (a), above, is that a valid certificate from the platform is on a file system accessible in the firmware of the computing system, then loading the platform into a configuration mode; and (d) if the determination made in step (a), above, is that the platform is set to an active/active-test mode, then loading the platform into the active/active-test mode. Other embodiments are described and claimed.

42 Claims, 8 Drawing Sheets

METHOD AND APPARATUS FOR FIRMWARE BASED SYSTEM SECURITY, INTEGRITY, AND RESTORATION

I. CROSS REFERENCE TO RELATED APPLICATIONS

This application claims the benefit of the filing date of U.S. Provisional Patent Application Ser. No. 61/846,606, filed on Jul. 15, 2013, entitled "Method for Firmware Based System Security, Integrity, and Restoration," the entire disclosure of which is hereby incorporated by reference into the present disclosure.

STATEMENT REGARDING FEDERALLY SPONSORED RESEARCH:

This invention was made with Government support under contract FA8750-12-C-0227 awarded by USAF. The Government has certain rights in the invention.

II. BACKGROUND

The invention relates generally to the field of computer security and firmware. More particularly, the invention relates to a method and apparatus for firmware based system security, integrity, and restoration for computers and mobile devices.

III. SUMMARY

In one respect, disclosed is a method for securing a computing system, the method comprising: (a) determining in a pre-boot environment of the computing system which mode a security and policy enforcement platform should be loaded into a firmware of the computing system; (b) if the determination made in step (a), above, is that it is the first time for the security and policy enforcement platform to be loaded, then loading the security and policy enforcement platform into the firmware of the computing system into a setup mode; (c) if the determination made in step (a), above, is that a valid certificate from the security and policy enforcement platform is on a file system accessible in the firmware of the computing system, then loading the security and policy enforcement platform into the firmware of the computing system into a configuration mode; and (d) if the determination made in step (a), above, is that the security and policy enforcement platform is set to an active/active-test mode, then loading the security and policy enforcement platform into the firmware of the computing system into the active/active-test mode.

In another respect, disclosed is a non-transitory computer-readable storage medium containing instructions that if executed enables a computing system to: (a) determine in a pre-boot environment of the computing system which mode a security and policy enforcement platform should be loaded into a firmware of the computing system; (b) if the determination made in step (a), above, is that it is the first time for the security and policy enforcement platform to be loaded, then load the security and policy enforcement platform into the firmware of the computing system into a setup mode; (c) if the determination made in step (a), above, is that a valid certificate from the security and policy enforcement platform is on a file system accessible in the firmware of the computing system, then load the security and policy enforcement platform into the firmware of the computing system into a configuration mode; and (d) if the determination made in step (a), above, is that the security and policy enforcement platform is set to an active/active-test mode, then load the security and policy enforcement platform into the firmware of the computing system into the active/active-test mode.

In yet another respect, disclosed is a computing system comprising: at least one storage device containing instructions that if executed enables the computing system to: (a) determine in a pre-boot environment of the computing system which mode a security and policy enforcement platform should be loaded into a firmware of the computing system; (b) if the determination made in step (a), above, is that it is the first time for the security and policy enforcement platform to be loaded, then load the security and policy enforcement platform into the firmware of the computing system into a setup mode; (c) if the determination made in step (a), above, is that a valid certificate from the security and policy enforcement platform is on a file system accessible in the firmware of the computing system, then load the security and policy enforcement platform into the firmware of the computing system into a configuration mode; and (d) if the determination made in step (a), above, is that the security and policy enforcement platform is set to an active/active-test mode, then load the security and policy enforcement platform into the firmware of the computing system into the active/active-test mode.

Numerous additional embodiments are also possible.

IV. BRIEF DESCRIPTION OF THE DRAWINGS

Other objects and advantages of the invention may become apparent upon reading the detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

V. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

Firmware is an underutilized sanctuary and foundation of trust in the computing environment, based on the technologies that can be developed and deployed in the area of trust and security. With cyber threats steadily increasing in sophistication, firmware based system security, integrity, and restoration may provide a robust foundation upon which to build cyber infrastructure. Today's firmware currently provides limited support for security, but the capabilities that do exist are often not fully utilized by software. It is a reasonable assumption that all software is vulnerable to attacks, and even hardware/firmware attacks are likely with the billions of diverse mobile computing and communications devices. Methods and apparatuses are needed for comprehensive security and policy enforcement beginning from the when a computer or mobile device is first powered on and lasting through even after the operating system has taken over.

Figure 1:
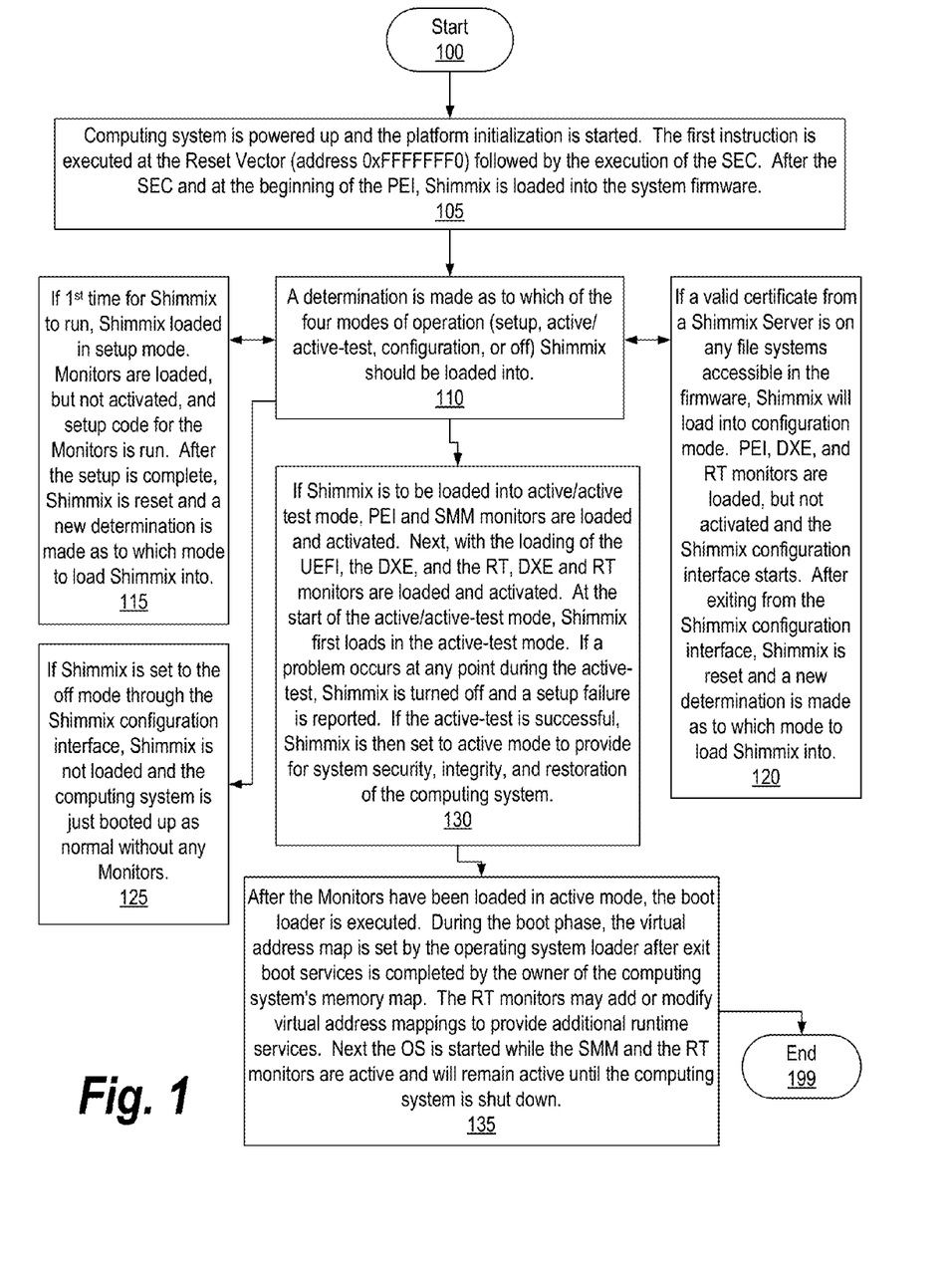
FIG. 1 is a flow diagram of an example program for firmware based system security, integrity, and restoration for computers and mobile devices, in accordance with some embodiments.

FIG. 1 is a flow diagram of an example program for firmware based system security, integrity, and restoration for computers and mobile devices, in accordance with some embodiments.

In some embodiments, a firmware based system security, integrity, and restoration for computers and mobile devices comprises a platform of security and policy enforcement programs in the system firmware. This security and policy enforcement platform is referred to as Shimmix and the programs/drivers within Shimmix are referred to as Monitors. Each Monitor has a single focus such as guarding against unauthorized code execution, or enforcing hardware configurations, etc. If possible, a Monitor will also fix any problems that are detected. For example, a File Monitor will replace a malicious OS bootloader with the good, original bootloader. Shimmix operates independent of any operating system (OS) and may run on servers, desktops, laptops, tablets, and mobile devices. In an enterprise system, the Shimmix platform may be loaded to a server to provide a centralized configuration, baselining, logging, and repository for the Monitors. Processing starts at block 100, whereupon at block 105 the computing system is powered up and the platform initialization (PI) is started. The term "computing system" may refer to any type of processor-based system, such as a desktop computer, a laptop computer, a server computer, an appliance or mobile computing device, or the like. For a modern Intel CPU, the first instruction (a jump to the memory location mapped to the BIOS entry point) is executed at the Reset Vector (address 0xFFFFFFF0) followed by the execution of the security phase (SEC). At this earliest possible moment after the SEC and at the beginning of the pre-extensible firmware interface (PEI), Shimmix is loaded into the system firmware. At block 110, a determination is made as to which of the four modes of operation (setup, active/active-test, configuration, or off) Shimmix should be loaded into.

At block 115, if a determination is made that it is the first time Shimmix is run, Shimmix will be loaded in setup mode. PEI monitors are loaded, but not activated and the setup code to set one or more variables and/or take measurements of aspects of the computing system firmware and/or hardware is run. In some embodiments, the measurements may take the form of a hash value. Next, with the loading of the unified extensible firmware interface (UEFI), the driver execution environment (DXE), and the runtime (RT), DXE and RT monitors are loaded, but not activated and the setup code to set one or more variables and/or take measurements of aspects of the computing system firmware and/or hardware is run. In some embodiments, the measurements may take the form of a hash value. Finally, after the setup is complete, Shimmix is reset and a new determination is made as to which mode to load Shimmix into. In some embodiments, after execution and completion of the setup mode, Shimmix is automatically reset into the active/active test mode.

At block 120, if a determination is made that a valid certificate from a Shimmix Server is on any file systems accessible in the firmware, Shimmix will load into configuration mode. In configuration mode, PEI monitors are loaded, but not activated. Next, with the loading of the UEFI, the DXE, and the RT, DXE and RT monitors are loaded, but not activated. Finally, the Shimmix configuration interface starts and then ultimately Shimmix is reset after the Shimmix configuration interface is exited from and a new determination is made as to which mode to load Shimmix into.

At block 125, if Shimmix is set to the off mode through the Shimmix configuration interface, Shimmix is not loaded and the computing system is just booted up as normal without any Monitors.

At block 130, if a determination is made that Shimmix is to be loaded into active/active-test mode, PEI and system management mode (SMM) monitors are loaded and activated. Next, with the loading of the UEFI, the DXE, and the RT, DXE and RT monitors are loaded and activated. At the start of the active/active-test mode, Shimmix first loads in the active-test mode. In the active-test mode, executing the active-test code comprises at least one of: taking measurements of aspects of the computing system firmware and/or hardware, comparing the measurements of aspects of the computing system firmware and/or hardware, logging events, preventing the computing system from booting, reporting the events to an event management system, receiving additional configuration from a management system, receiving additional input from the configuration interface of the security and policy enforcement platform; and restoring one or more compromised components of the computing system to a non-compromised state. If a problem occurs at any point during the active-test, Shimmix is turned off and a setup failure is reported. If the active-test is successful, Shimmix is then set to active mode to provide for system security, integrity, and restoration of the computing system.

At block 135, after the Monitors have been loaded in active mode, the boot loader is executed. During the boot phase, the virtual address map is set by the operating system loader after exit boot services are completed by the owner of the computing system's memory map. The RT monitors may add or modify virtual address mappings to provide additional runtime services. Next the OS is started while the SMM and the RT monitors are active and will remain active until the computing system is shut down and processing ends at block 199.

Figure 2:
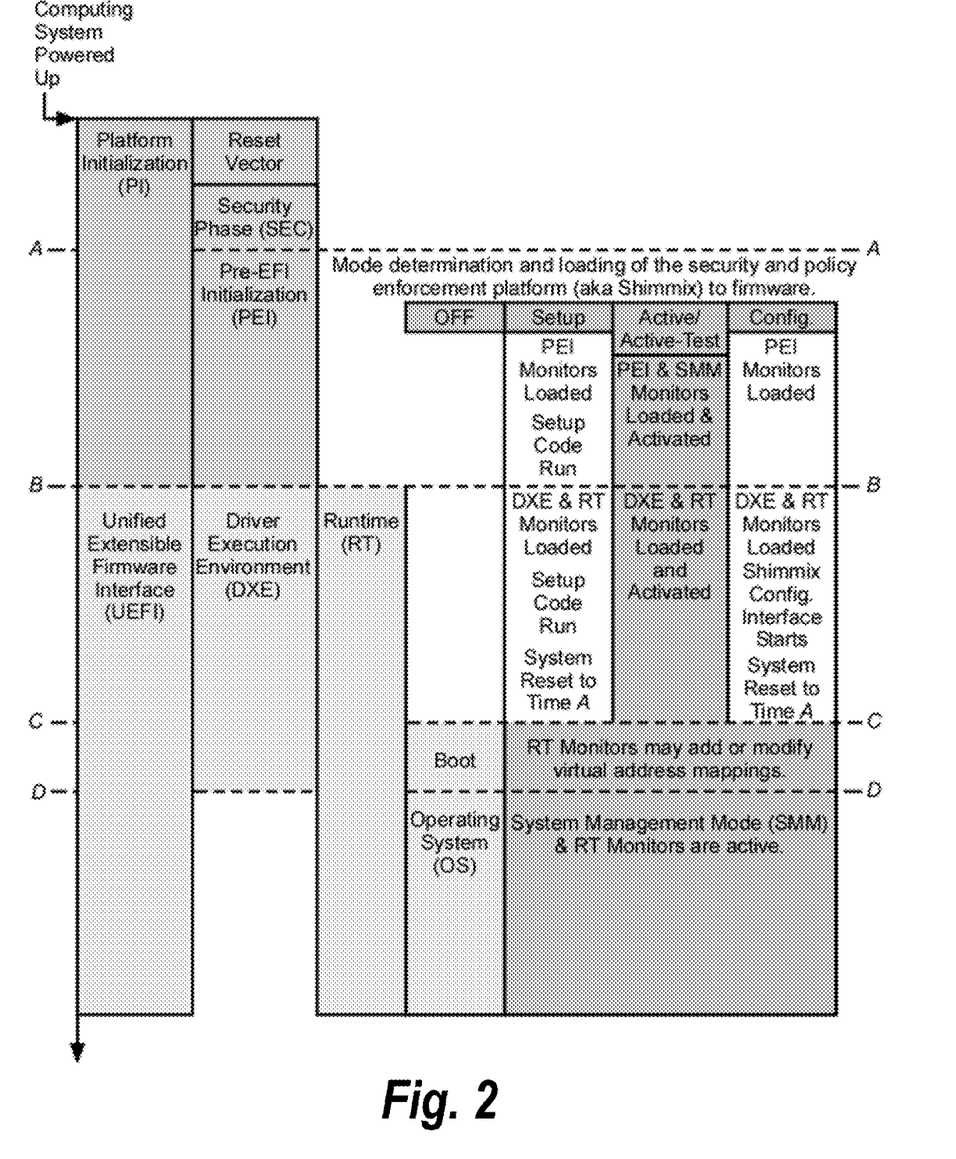
FIG. 2 is a graphical block representation of an example program flow for a firmware based system security, integrity, and restoration for computers and mobile devices, in accordance with some embodiments.

FIG. 2 is a graphical block representation of an example program flow for a firmware based system security, integrity, and restoration for computers and mobile devices, in accordance with some embodiments.

In some embodiments, after the computing system is powered up, the platform initialization is started. For a modern Intel CPU, the first instruction, a jump to the memory location mapped to the BIOS entry point, is executed at the Reset Vector followed by the execution of the SEC. At the point of time A after powering up of the computer system and along with the loading of the PEI, a determination is made as to which of the four modes of operation (setup, active/active-test, configuration, or off) Shimmix should be loaded into.

If a determination is made that it is the first time Shimmix is run, Shimmix will be loaded in setup mode. PEI monitors are loaded, but not activated and the setup code to set one or more variables and/or take measurements of aspects of the computing system firmware and/or hardware is run. Next, at the point of time B after powering up of the computer system and with the loading of the UEFI, the DXE, and the RT, DXE and RT monitors are loaded, but not activated and the setup code to set one or more variables and/or take measurements of aspects of the computing system firmware and/or hardware is run. Finally, after the setup is complete, Shimmix is reset to the point of time A and a new determination is made as to which mode to load Shimmix into. In some embodiments, after execution and completion of the setup mode, Shimmix is automatically reset into the active/active test mode.

If a determination is made that a valid certificate from a Shimmix Server is on any file systems accessible in the firmware, Shimmix will load into configuration mode. In configuration mode, PEI monitors are loaded, but not activated. Next, at the point of time B after powering up of the computer system and with the loading of the UEFI, the DXE, and the RT, DXE and RT monitors are loaded, but not activated. Finally, the Shimmix configuration interface starts. The Shimmix configuration interface displays one or more user data platform input options for the security and policy enforcement platform and/or displays one or more user data monitor input options for the one or more monitors. Ultimately, Shimmix is reset to the point of time A after the Shimmix configuration interface is exited from and a new determination is made as to which mode to load Shimmix into.

If a determination is made that Shimmix is set to the off mode, Shimmix is not loaded and the computing system is just booted up as normal without any Monitors. The off mode of Shimmix is set through the Shimmix configuration interface.

If a determination is made that Shimmix is to be loaded into active/active-test mode, PEI and SMM monitors are loaded and activated. Next, at the point of time B after powering up of the computer system and with the loading of the UEFI, the DXE, and the RT, DXE and RT monitors are loaded and activated. At the start of the active/active-test mode, Shimmix first loads in the active-test mode. In the active-test mode, executing the active-test code comprises at least one of: taking measurements of aspects of the computing system firmware and/or hardware, comparing the measurements of aspects of the computing system firmware and/or hardware, logging events, preventing the computing system from booting, reporting the events to an event management system, receiving additional configuration from a management system, receiving additional input from the configuration interface of the security and policy enforcement platform; and restoring one or more compromised components of the computing system to a non-compromised state. If a problem occurs at any point during the active-test, Shimmix is turned off and a setup failure is reported. If the active-test is successful, at point of time C after powering up the computing system, Shimmix is then set to active mode and the boot loader is executed. During the boot phase, the virtual address map is set by the operating system loader after exit boot services are completed by the owner (pre-boot environment) of the computing system's memory map. The RT monitors may add or modify virtual address mappings to provide additional runtime services. Finally, at the point of time D after powering up of the computer system and with ending of the DXE, the operating system is started while the SMM and RT Monitors of Shimmix are concurrently active to provide for system security, integrity, and restoration of the computing system if the situation so arises.

Shimmix is the security and policy platform which provides a unified interface and data formats for the various Monitors. Shimmix is responsible for the bulk of the work with regards to configuration, local or remote data storage/retrieval, and communication. The Monitors may comprise an Image Monitor, a Hardware Monitor, a File Monitor, a Network Monitor, and a Firmware Update Monitor. There may also be Monitors for security, for enforcing organizational policies, or for logging. In protecting the computing system, the Monitors check a local or remote database or data store of vendor firmware signatures, operating system libraries, and executable signatures to check the computing system's authenticity and integrity. The collection of signatures is provided by vendors and the initial computing system baseline as established by Shimmix. The database or data store provides the necessary end-to-end trust properties including, but not limited to the following: signed BIOS, signed firmware, signed system files, signed device drivers, and critical system files (e.g., .dll, .exe, .cab, .ocx, .msi, etc.). Additionally, a certificate authority may be used to provide an additional layer of end-to-end trust.

Figure 3A:
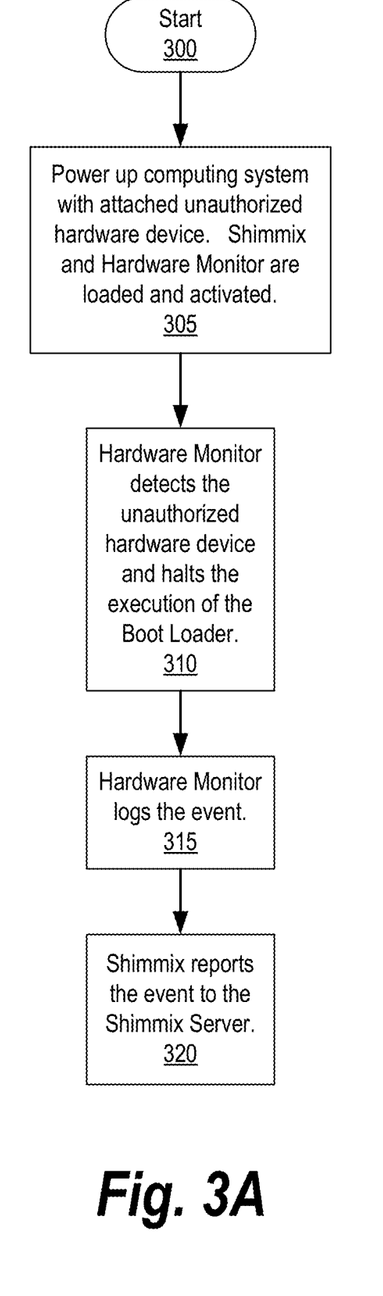
FIG. 3A and FIG. 3B are flow diagrams of an example program flow with and without a Hardware Monitor, respectively, in accordance with some embodiments.
Figure 3B:
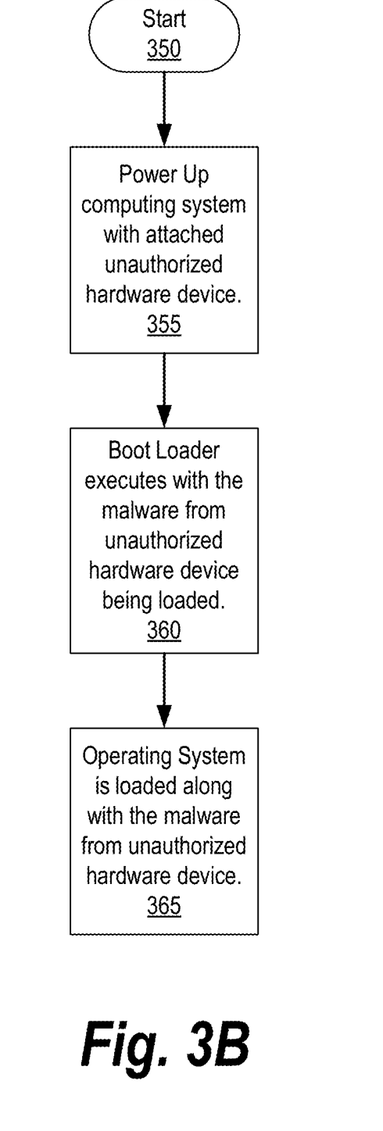

FIG. 3A and FIG. 3B are flow diagrams of an example program flow with and without a Hardware Monitor, respectively, in accordance with some embodiments.

In some embodiments, as illustrated in FIG. 3A, a Hardware Monitor is used to enforce a hardware configuration policy. Processing starts at block 300, whereupon at block 305 the computing system with the attached unauthorized hardware device is powered up. The unauthorized hardware device may comprise a USB, PCI, or similar device, such as a flash drive, printer, hard drive, or the like. After being powered up, Shimmix and Monitors are loaded and activated as described in FIG. 1 and FIG. 2. One of the Monitors may comprise a Hardware Monitor that is designed to enforce a hardware configuration policy of the computing system. At block 310, the Hardware Monitor detects the unauthorized hardware device and halts the execution of the Boot Loader, thus stopping the computing system at the point of time C as shown in FIG. 2. At block 315, the Hardware Monitor logs the event of the unauthorized hardware device and subsequent halting of the computing system. In some embodiments, at block 320, Shimmix reports the event to the Shimmix Server. The Hardware Monitor is also capable of detecting the lack or removal of mandatory hardware from the computing system and subsequently halts the execution of the Boot Loader.

Without Shimmix, as illustrated in FIG. 3B, processing starts at block 350, whereupon at block 355 the computing system with the attached unauthorized hardware device is powered up. The unauthorized hardware device may comprise a USB, PCI, or similar device, such as a flash drive, printer, hard drive, or the like. After being powered up, at block 360, the Boot Loader executes with the malware from the unauthorized hardware device being loaded. At block 365, the Operating System is loaded along with the malware from the unauthorized hardware device. The computing system is now infected with the malware from the unauthorized hardware device. Examples of this type of attack include a Stuxnet computer worm spread via USB and an "Evil Maid" attack.

Figure 4A:
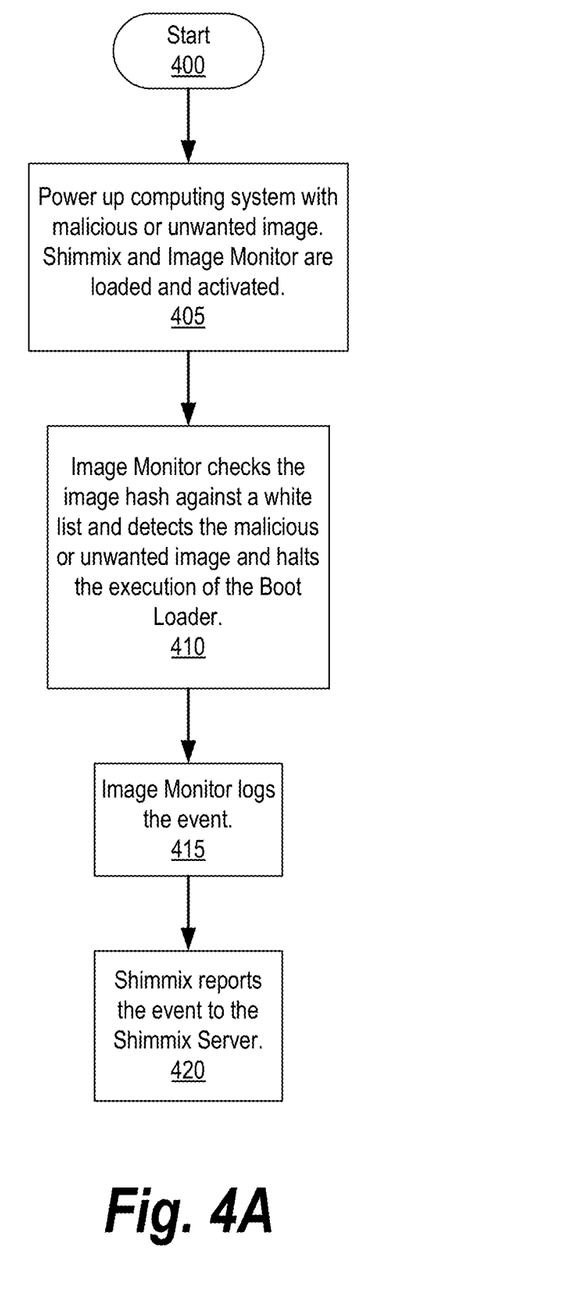
FIG. 4A and FIG. 4B are flow diagrams of an example program flow with and without an Image Monitor, respectively, in accordance with some embodiments.
Figure 4B:
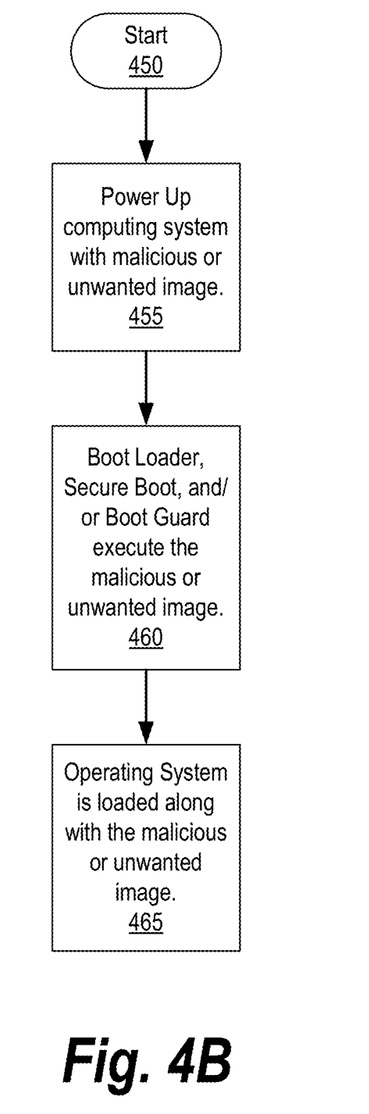

FIG. 4A and FIG. 4B are flow diagrams of an example program flow with and without an Image Monitor, respectively, in accordance with some embodiments.

In some embodiments, as illustrated in FIG. 4A, an Image Monitor is used to guard against execution of unauthorized images. An image as used herein is an executable binary. Some of the malicious images may be used to replace the OS loader with a bootkit such as the Dreamboot attack, compromise all preboot execution environment (PXE) boot clients on a thin client network by replacing the PXE boot image on the server, modify the memory map to store malicious code in the memory that is hidden to the OS, and/or inject malware into a user-initiated firmware update of Option ROM on PCT peripheral cards. An Image Monitor guards against such attacks by checking the image against a list of authorized images (white list) and prevents the execution of any image that is not on the list regardless of how it is signed. Processing starts at block 400, whereupon at block 405 the computing system with the malicious or unwanted image is powered up. After being powered up, Shimmix and Monitors are loaded and activated as described in FIG. 1 and FIG. 2. One of the Monitors may comprise an Image Monitor that is designed to guard against execution of malicious or unauthorized images. At block 410, the Image Monitor checks the image hash against a white list and is able to detect the malicious or unwanted image and halt the execution of the Boot Loader. Even with computing systems with Microsoft's Secure Boot (or Trusted Boot) and/or Intel's Boot Guard, unwanted or malicious images may still be executed as these unwanted or malicious images may actually be signed appropriately as these images may have been signed with stolen or leaked keys. The Shimmix Image Monitor may be used as a replacement layer in place of Secure Boot for situations where Secure Boot is not wanted, as an extra layer to Secure Boot to protect against keys that were leaked or stolen, or in lock down where only specifically authorized images are to be loaded. At block 415, the Image Monitor logs the event of the malicious or unwanted image and subsequent halting of the computing system. In some embodiments, at block 420, Shimmix reports the event to the Shimmix Server. In an enterprise environment, the malicious or unauthorized image may also be sent to the Shimmix Server for analysis.

Without Shimmix, as illustrated in FIG. 4B, processing starts at block 450, whereupon at block 455 the computing system with the malicious or unwanted image is powered up. After being powered up, at block 460, the Boot Loader, Secure Boot, and/or Boot Guard execute the malicious or unwanted image. At block 465, the Operating System is loaded along with the malicious or unwanted image. The computing system is now infected with the malicious or unwanted image.

Figure 5A:
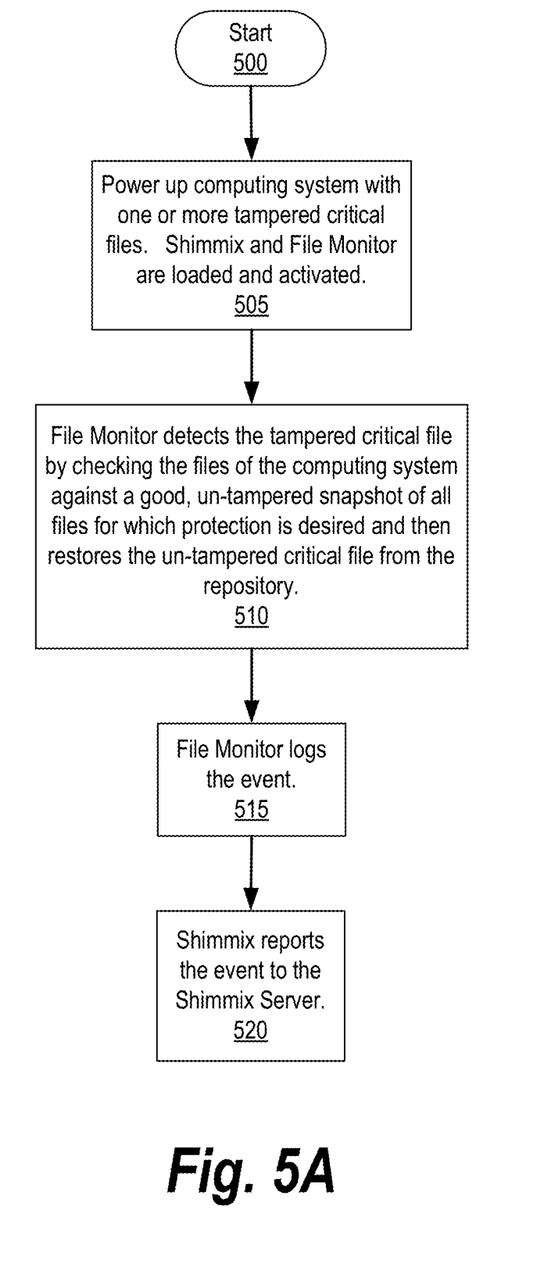
FIG. 5A and FIG. 5B are flow diagrams of an example program flow with and without a File Monitor, respectively, in accordance with some embodiments.
Figure 5B:
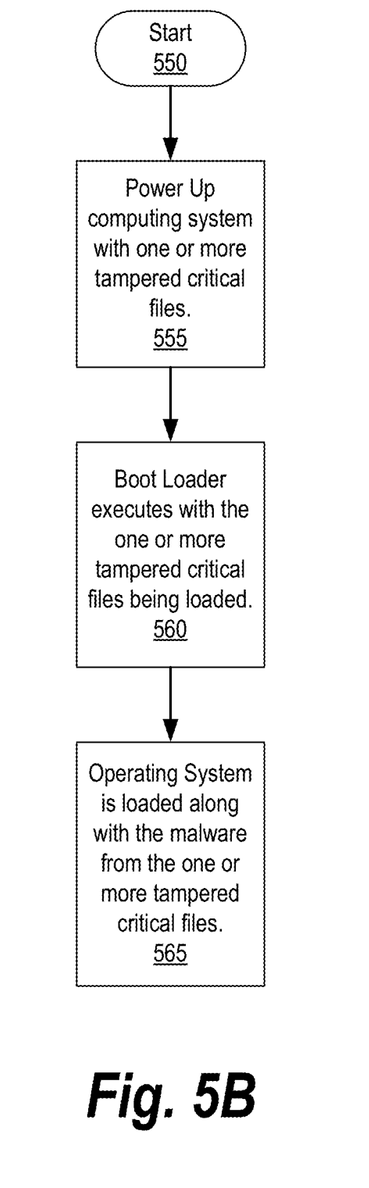

FIG. 5A and FIG. 5B are flow diagrams of an example program flow with and without a File Monitor, respectively, in accordance with some embodiments.

In some embodiments, as illustrated in FIG. 5A, a File Monitor is used to detect tampered critical files and if possible restore the tampered critical files. Processing starts at block 500, whereupon at block 505 the computing system with one or more tampered critical files is powered up. After being powered up, Shimmix and Monitors are loaded and activated as described in FIG. 1 and FIG. 2. One of the Monitors may comprise a File Monitor that is designed to detect tampered critical files (FAT and/or NTFS) and if possible restore the tampered critical files. At block 510, the File Monitor detects the one or more tampered critical files by checking the files of the computing system against a good, un-tampered snapshot of all files for which protection is desired. The snapshot is stored in a repository, either locally or on a server. If a tampered critical file is detected, it is replaced by the un-tampered critical file from the repository. At block 515, the File Monitor logs the event of the detection of the tampered critical file and its subsequent replacement. In some embodiments, at block 520, Shimmix reports the event(s) to the Shimmix server. In an enterprise environment, the one or more tampered critical files may also be sent to the Shimmix Server for analysis.

Without Shimmix, as illustrated in FIG. 5B, processing starts at block 550, whereupon at block 555 the computing system with one or more tampered critical files is powered up. After being powered up, at block 560, the Boot Loader executes with the one or more tampered critical files being loaded. At block 565, the Operating System is loaded along with the one or more tampered critical files. The computing system is now infected with the malware from the one or more tampered critical files. Examples of this type of attack include tampered critical files with malware designed to modify the OS loader's supporting boot files, to modify the OS's security accounts manager (SAM) file, kernel file, or system drivers, or to modify the host's file (such as the DNSChanger malware) or browser proxy settings.

Figure 6A:
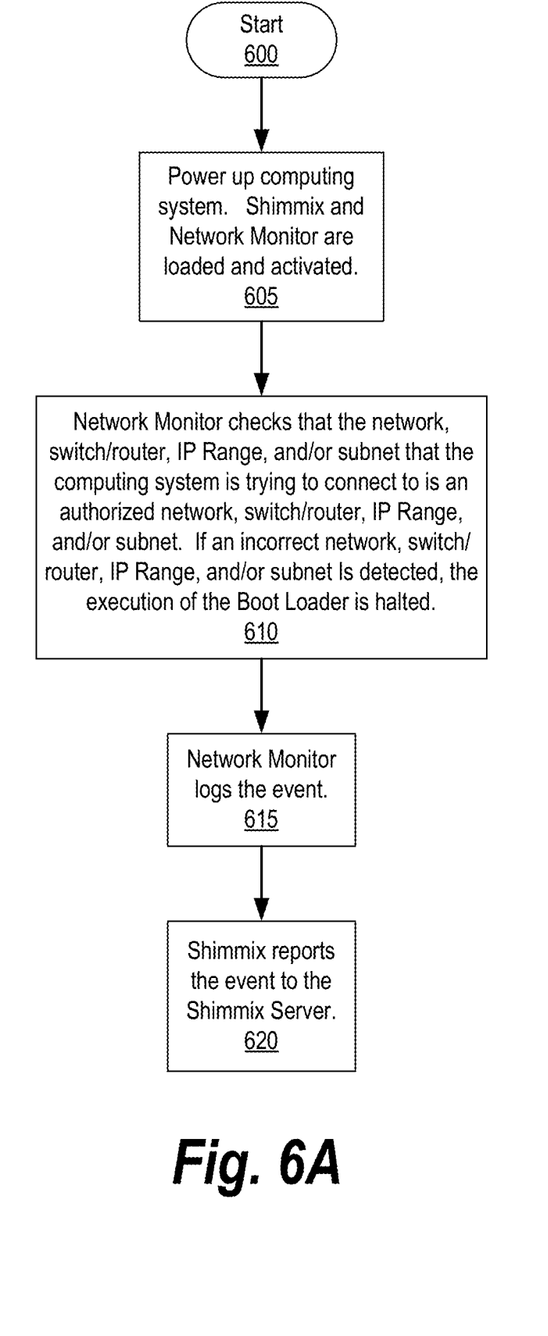
FIG. 6A and FIG. 6B are flow diagrams of an example program flow with and without a Network Monitor, respectively, in accordance with some embodiments.
Figure 6B:
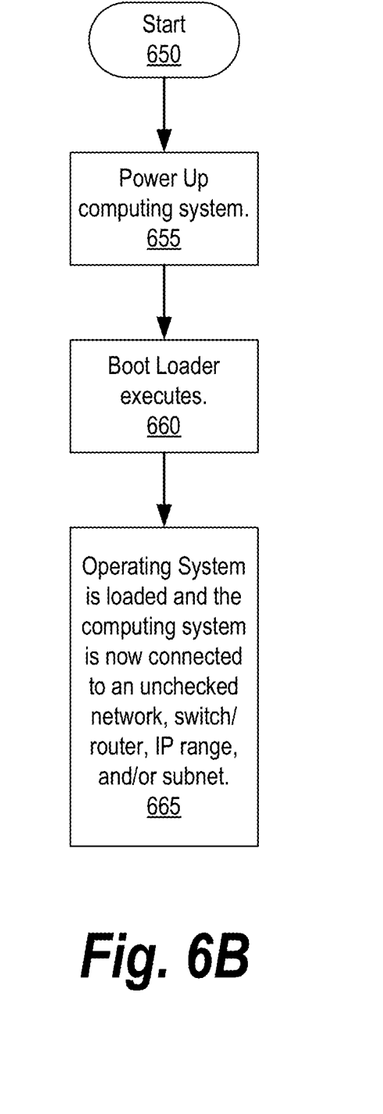

FIG. 6A and FIG. 6B are flow diagrams of an example program flow with and without a Network Monitor, respectively, in accordance with some embodiments.

In some embodiments, as illustrated in FIG. 6A, a Network Monitor is used to ensure that the computing system is on the correct network, desired switch/router, IP range, and/or subnet. Some computing systems should only be allowed to operate on certain networks such as a home network, corporate network, classified network, or unclassified network and within a certain network, only certain subnets such as accounting, engineering, DMZ, etc. Processing starts at block 600, whereupon at block 605 the computing system is powered up. After being powered up, Shimmix and Monitors are loaded and activated as described in FIG. 1 and FIG. 2. One of the Monitors may comprise a Network Monitor that is designed to ensure that the computing system is on the correct network, desired switch/router, IP range, and/or subnet. At block 610, the Network Monitor guards against connecting the computing system to incorrect networks, switches/routers, IP ranges, and/or subnets by checking the network, switch/router, IP range, and/or subnet that the computing system is trying to connect to against a list of authorized networks, switches/routers, IP ranges, and/or subnets. If an incorrect network, switch/router, IP range, and/or subnet is detected by the Network Monitor, the execution of the Boot Loader is halted. At block 615, the Network Monitor logs the event of the unauthorized network, switch/router, IP range, and/or subnet and subsequent halting of the computing system. In some embodiments, at block 620, Shimmix reports the event to the Shimmix Server when the computing system is returned to an authorized network, switch/router, IP range, and/or subnet.

Without Shimmix, as illustrated in FIG. 6B, processing starts at block 650, whereupon at block 655 the computing system is powered up. After being powered up, at block 660, the Boot Loader executes. At block 665, the Operating System is loaded and the computing system is now connected to an unchecked network, switch/router, IP range, and/or subnet.

In some embodiments, if the computing system is first booted in an authorized network, switch/router, IP range, and/or subnet and then subsequently moved to an unauthorized network, switch/router, IP range, and/or subnet, without being shut down, the Network Monitor would halt the computing system. A log of the event would be created and once the computing system was back on an authorized network, switch/router, IP range, and/or subnet, Shimmix would report the event to the Shimmix Server.

Figure 7:
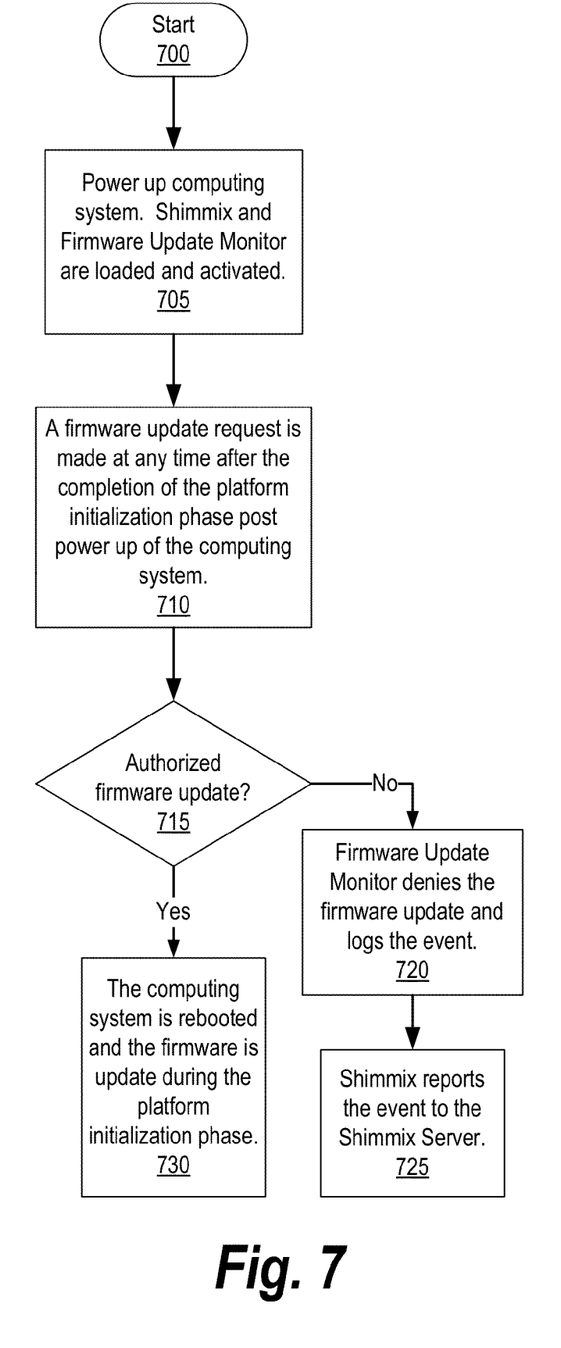
FIG. 7 is a flow diagram of an example program flow with a Firmware Update Monitor, respectively, in accordance with some embodiments.

FIG. 7 is a flow diagram of an example program flow with a Firmware Update Monitor, respectively, in accordance with some embodiments.

In some embodiments, as illustrated in FIG. 7, a Firmware Update Monitor is used to guard against malicious updates of the computing system firmware, such as an update of the firmware with completely malicious firmware using a compromised private key or vendor bug. Alternatively, the firmware may be maliciously updated with a legitimate, but old and vulnerable version of the firmware. Malicious updates of the computing system firmware may load malicious SMM drivers that may modify resource tables and functions that the OS implicitly trusts. This can enable persistent and undetectable modification of network data, the logging of key presses, or data exfiltration. This situation is potentially impossible to fix without opening the computing system and physically re-flashing the firmware. A Firmware Update Monitor guards against such attacks by checking the requested firmware update against a list of authorized firmware updates at the moment the firmware update is requested. Such a firmware update request may occur any time after the point of time B as shown in FIG. 2. Unauthorized firmware update attempts are denied and reported. Processing starts at block 700, whereupon at block 705 the computing system is powered up. After being powered up, Shimmix and Monitors are loaded and activated as described in FIG. 1 and FIG. 2. One of the Monitors may comprise a Firmware Update Monitor that is designed to guard against malicious updates to the firmware. At block 710, a firmware update is requested at any time after the completion of the platform initialization phase post power up of the computing system, i.e. after the point of time B as shown in FIG. 2. At decision block 715, the Firmware Update Monitor checks the requested firmware update against a list of authorized firmware updates. If the firmware update is unauthorized, processing continues to block 720 where the Firmware Update Monitor halts the unauthorized firmware update from being installed and logs the event of the unauthorized firmware update request and its subsequent denial. In some embodiments, at block 725, Shimmix reports the event to the Shimmix server. In an enterprise environment, the requested firmware update may also be sent to the Shimmix Server for analysis. If the firmware is authorized, from decision block 715, processing continues to block 730 where the firmware is updated in the platform initialization phase of the reboot of the computing system.

Figure 8:
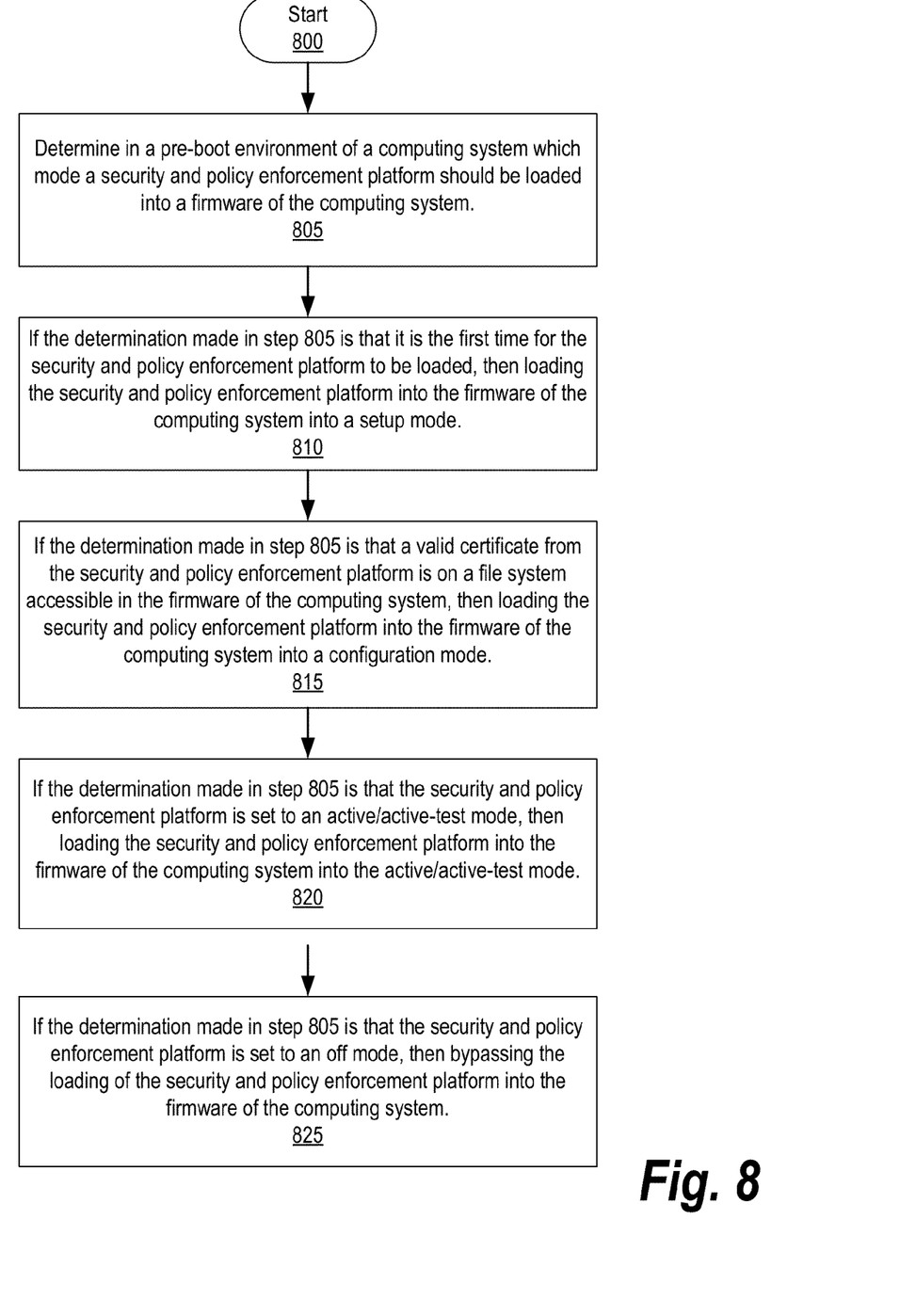
FIG. 8 is a block diagram illustrating a method for firmware based system security, integrity, and restoration for computing systems, in accordance with some embodiments.

FIG. 8 is a block diagram illustrating a method for firmware based system security, integrity, and restoration for computing systems, in accordance with some embodiments.

In some embodiments, as illustrated in FIG. 8, processing starts at block 800, whereupon at block 805 a determination is made in a pre-boot environment of a computing system which mode a security and policy enforcement platform should be loaded into a firmware of the computing system.

At block 810, if the determination made in step 805 is that it is the first time for the security and policy enforcement platform to be loaded, then the security and policy enforcement platform is loaded into the firmware of the computing system into a setup mode. Loading the security and policy enforcement platform into the firmware of the computing system into the setup mode comprises: loading, but not activating PEI monitors and running a setup code to set one or more variables and/or take measurements of aspects of the computing system firmware and/or hardware. In some embodiments, the measurements may take the form of a hash value. Next, with the loading of the unified extensible firmware interface (UEFI) or other BIOS, the driver execution environment (DXE), and the runtime (RT), loading but not activating DXE and RT monitors and running the setup code to set one or more variables and/or take measurements of aspects of the computing system firmware and/or hardware. In some embodiments, the measurements may take the form of a hash value. Finally, after the setup is complete, Shimmix is reset and a new determination is made as to which mode to load Shimmix into the firmware of the computing system. In some embodiments, after execution and completion of the setup mode, Shimmix is automatically reset into the active/active test mode.

At block 815, if the determination made in step 805 is that a valid certificate from the security and policy enforcement platform is on a file system accessible in the firmware of the computing system, then loading the security and policy enforcement platform into the firmware of the computing system into a configuration mode. Loading the security and policy enforcement platform into the firmware of the computing system into the configuration mode comprises: loading one or more monitors into the firmware of the computing system; loading and executing a configuration interface of the security and policy enforcement platform; and making a new determination in the pre-boot environment of the computing system which mode the security and policy enforcement platform should be loaded into the firmware of the computing system. In some embodiments, loading and executing the configuration interface of the security and policy enforcement platform comprises: displaying one or more user data platform input options for the security and policy enforcement platform; and displaying one or more user data monitor input options for the one or more monitors.

At block 820, if the determination made in step 805 is that the security and policy enforcement platform is set to an active/active-test mode, then loading the security and policy enforcement platform into the firmware of the computing system into the active/active-test mode. Loading the security and policy enforcement platform into the firmware of the computing system into the active/active-test mode comprises: loading and activating one or more monitors into the firmware of the computing system; executing an active-test code; and determining if the active-test code completed without any problems; if the determination made above is that the active-test code completed with problems, then creating a log of the problems and terminating the security and policy enforcement platform; and if the determination made above is that the active-test code completed without problems, then loading and executing an active mode of the security and policy enforcement platform. In some embodiments, executing the active-test code comprises at least one of: taking measurements of aspects of the computing system firmware and/or hardware, comparing the measurements of aspects of the computing system firmware and/or hardware, logging events, preventing the computing system from booting, reporting the events to an event management system, receiving additional configuration from a management system, receiving additional input from the configuration interface of the security and policy enforcement platform; and restoring one or more compromised components of the computing system to a non-compromised state.

At block 825, if the determination made in step 805 is that the security and policy enforcement platform is set to an off mode, then bypassing the loading of the security and policy enforcement platform into the firmware of the computing system.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A method for securing a computing system, the method comprising:
   (a) determining in a pre-boot environment of the computing system which mode a security and policy enforcement platform should be loaded into a firmware of the computing system;
   (b) if the determination made in step (a), above, is that it is the first time for the security and policy enforcement platform to be loaded, then loading the security and policy enforcement platform into the firmware of the computing system into a setup mode;
   (c) if the determination made in step (a), above, is that a valid certificate from the security and policy enforcement platform is on a file system accessible in the firmware of the computing system, then loading the security and policy enforcement platform into the firmware of the computing system into a configuration mode;
   (d) if the determination made in step (a), above, is that the security and policy enforcement platform is set to an active/active-test mode, then loading the security and policy enforcement platform into the firmware of the computing system into the active/active-test mode; and
   (e) if the determination made in step (a), above, is that the security and policy enforcement platform is set to an off mode, then bypassing the loading of the security and policy enforcement platform into the firmware of the computing system.

2. The method of claim 1, wherein the determination of which mode the security and policy enforcement platform should be loaded begins at the completion of a security phase of a platform initialization of the computing system.

3. The method of claim 1, wherein the loading the security and policy enforcement platform into the firmware of the computing system into the setup mode comprises:
   loading one or more monitors into the firmware of the computing system;
   executing a setup code; and
   making a new determination in the pre-boot environment of the computing system which mode the security and policy enforcement platform should be loaded into the firmware of the computing system.

4. The method of claim 3, wherein executing the setup code comprises setting one or more variables and/or taking measurements of aspects of the computing system firmware and/or hardware.

5. The method of claim 3, wherein the one or more monitors comprise at least one of: a PEI monitor, a SMM monitor, a DXE monitor, and a RT monitor.

6. The method of claim 3, wherein the one or more monitors comprise at least one of: a hardware monitor, an image monitor, a file monitor, a network monitor, and a firmware update monitor.

7. The method of claim 1, wherein the loading the security and policy enforcement platform into the firmware of the computing system into the configuration mode comprises:
   loading one or more monitors into the firmware of the computing system;
   loading and executing a configuration interface of the security and policy enforcement platform; and
   making a new determination in the pre-boot environment of the computing system which mode the security and policy enforcement platform should be loaded into the firmware of the computing system.

8. The method of claim 7, wherein loading and executing the configuration interface of the security and policy enforcement platform comprises:
   displaying one or more user data platform input options for the security and policy enforcement platform; and
   displaying one or more user data monitor input options for the one or more monitors.

9. The method of claim 7, wherein the one or more monitors comprise at least one of: a PEI monitor, a SMM monitor, a DXE monitor, and a RT monitor.

10. The method of claim 7, wherein the one or more monitors comprise at least one of: a hardware monitor, an image monitor, a file monitor, a network monitor, and a firmware update monitor.

11. The method of claim 1, wherein the loading the security and policy enforcement platform into the firmware of the computing system into the active/active-test mode comprises:
    loading and activating one or more monitors into the firmware of the computing system;
    executing an active-test code; and
    determining if the active-test code completed without any problems;
    if the determination made above is that the active-test code completed with problems, then creating a log of the problems and terminating the security and policy enforcement platform; and
    if the determination made above is that the active-test code completed without problems, then loading and executing an active mode of the security and policy enforcement platform.

12. The method of claim 11, wherein executing the active-test code comprises at least one of: taking measurements of aspects of the computing system firmware and/or hardware, comparing the measurements of aspects of the computing system firmware and/or hardware, logging events, preventing the computing system from booting, reporting the events to an event management system, receiving additional configuration from a management system, receiving additional input from the configuration interface of the security and policy enforcement platform; and restoring one or more compromised components of the computing system to a non-compromised state.

13. The method of claim 11, wherein the one or more monitors comprise at least one of: a PEI monitor, a SMM monitor, a DXE monitor, and a RT monitor.

14. The method of claim 11, wherein the one or more monitors comprise at least one of: a hardware monitor, an image monitor, a file monitor, a network monitor, and a firmware update monitor.

15. A non-transitory computer-readable storage medium containing instructions that if executed enables a computing system to:
   (a) determine in a pre-boot environment of the computing system which mode a security and policy enforcement platform should be loaded into a firmware of the computing system;
   (b) if the determination made in step (a), above, is that it is the first time for the security and policy enforcement platform to be loaded, then load the security and policy enforcement platform into the firmware of the computing system into a setup mode;
   (c) if the determination made in step (a), above, is that a valid certificate from the security and policy enforcement platform is on a file system accessible in the firmware of the computing system, then load the security and policy enforcement platform into the firmware of the computing system into a configuration mode;
   (d) if the determination made in step (a), above, is that the security and policy enforcement platform is set to an active/active-test mode, then load the security and policy enforcement platform into the firmware of the computing system into the active/active-test mode; and
   (e) set to an off mode the security and policy enforcement platform if the determination made in step (a), above, is that the security and policy enforcement platform is set to an off mode.

16. The non-transitory computer-readable storage medium of claim 15, wherein the determination of which mode the security and policy enforcement platform should be loaded begins at the completion of a security phase of a platform initialization of the computing system.

17. The non-transitory computer-readable storage medium of claim 15, wherein loading the security and policy enforcement platform into the firmware of the computing system into the setup mode comprises:
   loading one or more monitors into the firmware of the computing system;
   executing a setup code; and
   making a new determination in the pre-boot environment of the computing system which mode the security and policy enforcement platform should be loaded into the firmware of the computing system.

18. The non-transitory computer-readable storage medium of claim 17, wherein executing the setup code comprises setting one or more variables and/or taking measurements of aspects of the computing system firmware and/or hardware.

19. The non-transitory computer-readable storage medium of claim 17, wherein the one or more monitors comprise at least one of: a PEI monitor, a SMM monitor, a DXE monitor, and a RT monitor.

20. The non-transitory computer-readable storage medium of claim 17, wherein the one or more monitors comprise at least one of: a hardware monitor, an image monitor, a file monitor, a network monitor, and a firmware update monitor.

21. The non-transitory computer-readable storage medium of claim 15, wherein loading the security and policy enforcement platform into the firmware of the computing system into the configuration mode comprises:
   loading one or more monitors into the firmware of the computing system;
   loading and executing a configuration interface of the security and policy enforcement platform; and
   making a new determination in the pre-boot environment of the computing system which mode the security and policy enforcement platform should be loaded into the firmware of the computing system.

22. The non-transitory computer-readable storage medium of claim 21, wherein loading and executing the configuration interface of the security and policy enforcement platform comprises:
   displaying one or more user data platform input options for the security and policy enforcement platform; and
   displaying one or more user data monitor input options for the one or more monitors.

23. The non-transitory computer-readable storage medium of claim 21, wherein the one or more monitors comprise at least one of: a PEI monitor, a SMM monitor, a DXE monitor, and a RT monitor.

24. The non-transitory computer-readable storage medium of claim 21, wherein the one or more monitors comprise at least one of: a hardware monitor, an image monitor, a file monitor, a network monitor, and a firmware update monitor.

25. The non-transitory computer-readable storage medium of claim 15, wherein loading the security and policy enforcement platform into the firmware of the computing system into the active/active-test mode comprises:
   loading and activating one or more monitors into the firmware of the computing system;
   executing an active-test code; and
   determining if the active-test code completed without any problems;
   if the determination made above is that the active-test code completed with problems, then creating a log of the problems and terminating the security and policy enforcement platform; and
   if the determination made above is that the active-test code completed without problems, then loading and executing an active mode of the security and policy enforcement platform.

26. The non-transitory computer-readable storage medium of claim 25, wherein executing the active-test code comprises at least one of: taking measurements of aspects of the computing system firmware and/or hardware, comparing the measurements of aspects of the computing system firmware and/or hardware, logging events, preventing the computing system from booting, reporting the events to an event management system, receiving additional configuration from a management system, receiving additional input from the configuration interface of the security and policy enforcement platform; and restoring one or more compromised components of the computing system to a non-compromised state.

27. The non-transitory computer-readable storage medium of claim 25, wherein the one or more monitors comprise at least one of: a PEI monitor, a SMM monitor, a DXE monitor, and a RT monitor.

28. The non-transitory computer-readable storage medium of claim 25, wherein the one or more monitors comprise at least one of: a hardware monitor, an image monitor, a file monitor, a network monitor, and a firmware update monitor.

29. A computing system comprising:
  at least one storage device containing instructions that if executed enables the computing system to:
  (a) determine in a pre-boot environment of the computing system which mode a security and policy enforcement platform should be loaded into a firmware of the computing system;
  (b) if the determination made in step (a), above, is that it is the first time for the security and policy enforcement platform to be loaded, then load the security and policy enforcement platform into the firmware of the computing system into a setup mode;
  (c) if the determination made in step (a), above, is that a valid certificate from the security and policy enforcement platform is on a file system accessible in the firmware of the computing system, then load the security and policy enforcement platform into the firmware of the computing system into a configuration mode;
  (d) if the determination made in step (a), above, is that the security and policy enforcement platform is set to an active/active-test mode, then load the security and policy enforcement platform into the firmware of the computing system into the active/active-test mode; and
  (e) set to an off mode the security and policy enforcement platform if the determination made in step (a), above, is that the security and policy enforcement platform is set to an off mode.

30. The computing system of claim 29, wherein the determination of which mode the security and policy enforcement platform should be loaded begins at the completion of a security phase of a platform initialization of the computing system.

31. The computing system of claim 29, wherein loading the security and policy enforcement platform into the firmware of the computing system into the setup mode comprises:
  loading one or more monitors into the firmware of the computing system;
  executing a setup code; and
  making a new determination in the pre-boot environment of the computing system which mode the security and policy enforcement platform should be loaded into the firmware of the computing system.

32. The computing system of claim 31, wherein executing the setup code comprises setting one or more variables and/or taking measurements of aspects of the computing system firmware and/or hardware.

33. The computing system of claim 31, wherein the one or more monitors comprise at least one of: a PEI monitor, a SMM monitor, a DXE monitor, and a RT monitor.

34. The computing system of claim 31, wherein the one or more monitors comprise at least one of: a hardware monitor, an image monitor, a file monitor, a network monitor, and a firmware update monitor.

35. The computing system of claim 29, wherein loading the security and policy enforcement platform into the firmware of the computing system into the configuration mode comprises:
  loading one or more monitors into the firmware of the computing system;
  loading and executing a configuration interface of the security and policy enforcement platform; and
  making a new determination in the pre-boot environment of the computing system which mode the security and policy enforcement platform should be loaded into the firmware of the computing system.

36. The computing system of claim 35, wherein loading and executing the configuration interface of the security and policy enforcement platform comprises:
  displaying one or more user data platform input options for the security and policy enforcement platform; and
  displaying one or more user data monitor input options for the one or more monitors.

37. The computing system of claim 35, wherein the one or more monitors comprise at least one of: a PEI monitor, a SMM monitor, a DXE monitor, and a RT monitor.

38. The computing system of claim 35, wherein the one or more monitors comprise at least one of: a hardware monitor, an image monitor, a file monitor, a network monitor, and a firmware update monitor.

39. The computing system of claim 29, wherein loading the security and policy enforcement platform into the firmware of the computing system into the active/active-test mode comprises:
  loading and activating one or more monitors into the firmware of the computing system;
  executing an active-test code; and
  determining if the active-test code completed without any problems;
  if the determination made above is that the active-test code completed with problems, then creating a log of the problems and terminating the security and policy enforcement platform; and
  if the determination made above is that the active-test code completed without problems, then loading and executing an active mode of the security and policy enforcement platform.

40. The computing system of claim 39, wherein executing the active-test code comprises at least one of: taking measurements of aspects of the computing system firmware and/or hardware, comparing the measurements of aspects of the computing system firmware and/or hardware, logging events, preventing the computing system from booting, reporting the events to an event management system, receiving additional configuration from a management system, receiving additional input from the configuration interface of the security and policy enforcement platform; and restoring one or more compromised components of the computing system to a non-compromised state.

41. The computing system of claim 39, wherein the one or more monitors comprise at least one of: a PEI monitor, a SMM monitor, a DXE monitor, and a RT monitor.

42. The computing system of claim 39, wherein the one or more monitors comprise at least one of: a hardware monitor, an image monitor, a file monitor, a network monitor, and a firmware update monitor.

* * * * *